US00RE36757E

United States Patent [19]

Himes

[11] E Patent Number: Re. 36,757

[45] Reissued Date of Patent: Jun. 27, 2000

[54] MULTIBLOCK HYDROGENATED POLYMERS FOR ADHESIVES

[75] Inventor: Glenn Roy Himes, Houston, Tex.

[73] Assignee: Shell Oil Company, Houston, Tex.

[21] Appl. No.: 08/805,599

[22] Filed: Feb. 26, 1997

Related U.S. Patent Documents

Reissue of:

[64] Patent No.: 5,589,542
Issued: Dec. 31, 1996
Appl. No.: 08/320,033
Filed: Oct. 7, 1994

U.S. Applications:

[63] Continuation-in-part of application No. 08/147,218, Nov. 3, 1993, abandoned.

[51] Int. Cl.[7] ..... C08L 53/02; C08F 297/04

[52] U.S. Cl. ..... 525/98; 525/95; 525/314; 524/505

[58] Field of Search ..... 525/98, 95, 314; 524/505

[56] References Cited

U.S. PATENT DOCUMENTS

| | | | |
|---|---|---|---|
| 3,670,054 | 6/1972 | De La Mare et al. | 525/314 |
| 3,686,365 | 8/1972 | Sequeira | 525/89 |
| 4,168,286 | 9/1979 | Moczygemba | 525/314 |
| 4,267,096 | 5/1981 | Bussink et al. | 525/67 |
| 4,304,881 | 12/1981 | Aoki et al. | 525/66 |
| 4,564,655 | 1/1986 | Liu | 525/92 |
| 4,874,821 | 10/1989 | Agostinis et al. | 525/271 |
| 5,082,732 | 1/1992 | Ueda et al. | 428/402 |
| 5,120,765 | 6/1992 | Southwick et al. | 524/505 |
| 5,292,820 | 3/1994 | Coolbaugh et al. | 525/314 |

FOREIGN PATENT DOCUMENTS

| | | |
|---|---|---|
| 0524765 | 1/1993 | European Pat. Off. . |
| 46-039476 | 11/1971 | Japan . |
| 7139476 | 11/1971 | Japan . |
| 49-050037 | 5/1974 | Japan . |
| 51-146537 | 12/1976 | Japan . |
| 59-038029 | 3/1984 | Japan . |
| 60-228520 | 10/1985 | Japan . |
| 61-200150 | 9/1986 | Japan . |
| 2225330 | 11/1989 | United Kingdom . |
| 2 225 330 | 5/1990 | United Kingdom . |
| 9007602 | 12/1988 | WIPO . |

*Primary Examiner*—Mark L. Warzel
*Attorney, Agent, or Firm*—Donald F. Haas

[57] ABSTRACT

The present invention encompasses nontapered block copolymers of the following structure and adhesives containing them $$D—A—(B—A)_n—D_x$$

or $$(D—A—B)_z—Y$$

where A is a vinyl aromatic hydrocarbon polymer block, B and D are hydrogenated conjugated diene polymer blocks wherein if the diene is butadiene, it must have a vinyl content of at least 30 percent by weight, n is an integer from 1 to 5, x is 0 or 1, z is an integer from 2 to 30, and Y is a multifunctional coupling agent and the copolymer has a vinyl aromatic hydrocarbon content of from 9 to 35 percent by weight. The ratio of the molecular weight of D to that of B ranges in accordance with the normalized molecular weight factor which may range from greater than 0 up to $180\times10^{-6}$.

9 Claims, No Drawings

MULTIBLOCK HYDROGENATED POLYMERS FOR ADHESIVES

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 08/147,218, filed Nov. 3, 1993, now abandoned.

BACKGROUND OF THE INVENTION

This invention is directed to adhesive compositions which contain multiblock hydrogenated block copolymers of vinyl aromatic hydrocarbons and conjugated dienes. More particularly, the invention is related to such adhesive compositions which contain a polymer with at least one end-block of a hydrogenated conjugated diene.

Block copolymers have been employed in adhesive compositions for many years, primarily because of their high cohesive strengths and their ability to crosslink without a chemical vulcanization step. Block copolymers such as those described in U.S. Pat. No. 3,239,478 are either linear or radial or star styrene-butadiene or styrene-isoprene block copolymers.

These conventional block copolymers when used in adhesives tend to degrade in processing and/or over time because they are unsaturated in the main rubber chain. These unsaturation sites are reactive sites which are vulnerable to attack, such as by free radicals created by oxidation, ultraviolet light or mechanical action. As a result, the polymer chain may be severed by chain scission, reducing the molecular weight and those properties which are sensitive to molecular weight. Alternatively, the unsaturation sites may be subjected to grafting and crosslinking reactions which raise the molecular weight and undesirably stiffen the polymer making it unprocessable or ineffective as an adhesive. Hydrogenating the conventional unsaturated base polymers creates a nonpolar polymer which, although more stable, is difficult to tackify with resin additives and which is therefore inferior to conventional polymers in some applications, including some pressure sensitive adhesives applications.

Conventional saturated block copolymers designed for use in adhesive formulations are triblock copolymers wherein the terminal blocks are hard phase polymers such as polystyrene blocks. Often, such hard phase terminated block copolymers, especially those with saturated rubber blocks, lack the tackiness and peel adhesion of unsaturated block copolymers in adhesive formulations. Blending hard phase terminated block copolymers with diblock copolymers improves tackiness and peel adhesion but at the cost of decreasing shear properties such as holding power and shear adhesion failure temperature (SAFT).

The present invention offers a solution to some of these problems without sacrificing the adhesive qualities of unsaturated block copolymers. It does so by providing a polymer which has at least one hydrogenated conjugated diene block on the end of the polymer.

SUMMARY OF THE INVENTION

The present invention provides improved adhesive compositions which comprise a non-tapered multiblock copolymer of the formula $$D—A—(B—A)_n—D_x$$

wherein A is a vinyl aromatic hydrocarbon polymer block having a molecular weight of from 4000 to 35,000, B is a hydrogenated conjugated diene polymer block having a molecular weight of from 20,000 to 200,000, provided that if butadiene is the diene, it must have a vinyl content of 30 to 65%, by weight, D is a hydrogenated conjugated diene polymer block having a molecular weight of 5000 to 50,000 with the same proviso if butadiene is the diene, and the ratio of the molecular weight of D to the molecular weight of B before normalizing may range such that the normalized molecular weight factor determined by the formula $$\frac{\frac{MW_D}{MW_B}}{Frac.S \times Total\,MW \times Frac.Polymer\,Form.}$$

ranges from greater than 0 up to $180\times10^{-6}$, preferably greater than 0 up to $100\times10^{-6}$, and n is an integer from 1 to 5 and x is 0 or 1. $MW_D$ and $MW_B$ are the molecular weights of the D and B blocks, respectively. The molecular weight ratio for linear polymers preferably is less than 0.4. Fraction S is the weight fraction of vinyl aromatic hydrocarbon in the polymer. Total MW is the total molecular weight of the polymer. Frac. Polymer Form. is the weight fraction of the polymer used in the adhesive formulation. The composition also comprises a tackifying resin which is compatible with the block copolymer.

In another embodiment of the present invention, there is provided an adhesive composition which contains a coupled block copolymer of the formula $$(D—A—B)_x—Y$$

wherein Y is a multifunctional coupling agent, x is an integer from 2 to 30, and D, A and B are defined as in the preceding paragraph. The molecular weight ratio before normalizing, $$\frac{MW_D}{MW_B},$$

for such polymers preferably ranges from 0.1 to 2.2. This composition also comprises one or more tackifying resins.

The compositions of this invention exhibit the advantageous characteristics of compositions containing hydrogenated conjugated block copolymers, i.e., resistance to heat, oxidation, ultraviolet light, etc. Such compositions also simultaneously exhibit good tack, peel strength, shear and viscosity behavior. These polymers retain peel strength upon aging longer than other polymers. The key aspect of the invention is the combining of at least two network-forming, i.e., load-bearing, hard blocks (the A blocks) in the same molecule with one or more terminal hydrogenated rubber blocks (the D blocks) which are relatively easy to tackify using resin additives.

DETAILED DESCRIPTION OF THE INVENTION

The A blocks are polymer blocks of a vinyl aromatic hydrocarbon. Preferably, the vinyl aromatic hydrocarbon is styrene. Other useful vinyl aromatic hydrocarbons include alphamethylstyrene, various alkyl-substituted styrenes, alkoxy-substituted styrenes, vinyl naphthalene, vinyl toluene and the like. The B and D blocks are polymer blocks of conjugated dienes. Preferred dienes include butadiene and isoprene, with isoprene being much preferred, especially for the D blocks. If butadiene is the diene used, it must have 30% to 65% vinyl content (1,2-butadiene microstructure), by weight or the hydrogenated polymer will have an excessive amount of crystalline polyethylene in the diene blocks and the polymer will not be sufficiently elastomeric. Other dienes may also be used, including piperylene, methylpentadiene, phenylbutadiene, 3,4-dimethyl-1,3-hexadiene, 4,5-diethyl-1,3-octadiene and the like, preferably those conjugated dienes containing 4 to 8 carbon atoms. The conjugated diene employed in the B block may differ from that employed in the D block. If process simplicity is most important, it is preferred that the same diene be employed in both blocks. Mixtures of conjugated dienes may also be employed.

The multiblock polymers of the present invention which are linear in nature may be produced by coupling or by sequential polymerization. Sequential polymerization basically involves first anionically polymerizing the D block, then anionically polymerizing the A block on the end thereof, then anionically polymerizing the B block on the end thereof, and then anionically polymerizing another A block on the end of the polymer, and finally, if desired, polymerizing the other D block at the end of the polymer. Of course, if a longer multiblock polymer is desired, the B block polymerizing and the second A block polymerization are repeated as often as desired. These polymers may not be tapered.

In general, the method described is used to prepare coupled polymers with any polymer containing a reactive end group which will react with one or more functional groups contained in the selected coupling agent. The method is particularly suitable for the preparation of coupled polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of coupled polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

$$RLi$$

wherein R is an aliphatic, cycloaliphatic, alkyl-substituted cycloaliphatic, aromatic or alkyl-substituted aromatic hydrocarbon radical having from 1 to 20 carbon atoms.

In general, the living polymers used as arms in the coupled polymer will be contacted with the coupling agent at a temperature within the range from 0° C. to 100° C. at a pressure within the range from 0 bar to 7 bar and the contacting will be maintained until reaction between the arms and the coupling agent is complete or at least substantially completed, generally for a period of time within the range from 1 to 180 minutes.

In general, the polymers of this invention will be in solution when sequentially polymerized or when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the coupled polymers of this invention will contain a single terminal reactive group, the polymers used in preparation of the coupled polymers will be retained in solution after preparation without deactivating the reactive (living) site. In general, the coupling agents may be added to a solution of the polymer or a solution of the polymer may be added to the coupling agent.

Any of the coupling agents known in the prior art to be useful in forming a polymer by contacting the same with a living polymer may be used in the method of this invention. Suitable coupling agents will contain two or more functional groups which will react with the living polymer at the metal-carbon bond. While the method of the present invention will, theoretically, at least, improve the relative distribution of different arms in a coupled polymer having any number of arms, the method offers significant improvement when the coupling agent contains from three to about twelve functional groups reactive with the metal-carbon bond of the "living" polymer. Suitable coupling agents, then include dibromoethane, $SIX_4$, $RSiX_3$, $HSiX_3$, $X_3Si—SiX_3$, $X_3Si—O—SiX_3$, $X_3Si—(CH_2)_x—SiX_3$, $R—C(SiX_3)_3$, $R—C(CH_2SiX_3)_3$, $C(CH_2SiX_3)_4$ and the like. In the foregoing formulae: each X may, independently, be fluorine, chlorine, bromine, iodine, alkoxide radicals, carboxylate radicals, hydride and the like; R is a hydrocarbyl radical having from 1 to about 10 carbon atoms, preferably from 1 to about 6 carbon atoms; and x is a whole number from 1 to about 6. Particularly useful coupling agents include the silicon tetrahalides such as silicon tetrafluoride, silicon tetrachloride, silicon tetrabromide and the like.

The coupling process per se is described in detail in U.S. Pat. No. 4,096,203 which is herein incorporated by reference. Specific multifunctional coupling agents useful herein are described in that patent but there are other coupling agents which may also be useful herein.

Star polymers are made by coupling polymer arms using a polyfunctional coupling agent or coupling monomer. A preferred coupling agent is a polyalkenyl aromatic coupling agent such as those described in U.S. Pat. Nos. 4,010,226, 4,391,949 and 4,444,953, which are herein incorporated by reference. U.S. Pat. No. 5,104,921, which is also herein incorporated by reference, contains a complete description of such polyakenyl aromatic compounds at columns 12 and 13. Divinyl aromatic hydrocarbons containing up to 26 carbon atoms per molecule are preferred and particularly divinyl benzene in either its meta, or para isomer and commercial divinyl benzene which is a mixture of said isomers is also quite satisfactory. The coupling agent is preferably added to the living polymer after the polymerization is substantially complete. The amount of coupling agent varies between wide limits but preferably at least one equivalent is used per equivalent of unsaturated living polymer to be coupled. The coupling reaction is generally carried out in the same solvent as for the polymerization reaction. The temperature varies between wide limits, for example, from 25° C. to 95° C.

The B and D diene blocks may be hydrogenated as generally described in the prior art, preferably so as to reduce at least about 90 percent of any olefinic double bonds in the polymer chains. Suitably at least 50 percent, preferably at least 70 percent, and more preferably at least 90 percent, most preferably at least 95 percent of the original olefinic unsaturation is hydrogenated.

The hydrogenation of these diene blocks may be carded out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and Pat. No. Reissue 27,145, the disclosures of which are herein incorporated by reference. The polymers are hydrogenated in such a manner as to produce hydrogenated polymers having a residual unsaturation content in the polydiene block of less than about 20 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The polymers of the present invention preferably have a molecular weight of from 45,000 to 250,000. The A blocks have a molecular weight of from 4000 to 35,000. A block molecular weights less than 4000 provide poor holding power, shear properties and cohesive strength. Molecular weights greater than 35,000 give a stiff adhesive that has poor pressure sensitivity. The B blocks should have a molecular weight of from 20,000 to 200,000. B blocks less than 20,000 provide a weak polymer with low shear properties. B blocks greater than 200,000 are difficult to process. The D blocks should have a molecular weight of from 5000 to 50,000. D blocks less than 5000 do not impart the desired tack and adhesive properties. D blocks greater than 50,000 dilute the load-bearing (network-forming) rubber fraction excessively, causing low holding power and poor cohesive strength. The ratio of the molecular weight of the D blocks to the molecular weight of the B blocks must fall within the range defined by the molecular weight normalizing factor which is determined according to the formula described above. Levels of D blocks which are too high will dilute the fraction of load-bearing rubber, causing low holding power and poor cohesive strength. The normalizing factor accounts for other variables, namely polyvinyl aromatic hydrocarbon content, total polymer molecular weight, and the amount of polymer in the adhesive formulation, which affect the adhesive properties, especially holding power. The normalizing factor has a good negative slope correlation with holding power. The normalizing factor must be greater than 0 and should not be more than $180\times10^{-6}$, preferably not more than $100\times10^{-6}$, because the holding power of the formulation will be too low. In order to achieve a holding power to steel at room temperature (½" by ½" sample, 2 kg weight) of 100 min. or better, the normalizing factor must not be greater than $180\times10^{-6}$. Preferably, the ratio, $$\frac{MW_D}{MW_B}$$

(before normalizing), for linear polymers should be less than 0.4 and for star polymers, it should be 0.1 to 2.2.

The vinyl aromatic hydrocarbon, generally styrene, content of the polymers of the present invention ranges from 9 to 35 percent by weight because lower levels give weak polymers which impart poor shear properties and higher levels give stiff adhesives which are not pressure sensitive. The number of terminal rubber blocks in the polymers of the present invention ranges from 1 to 30, with the higher numbers being applicable to radial and star block copolymers.

Molecular weights are conveniently measured by Gel Permeation Chromatography (GPC), where the GPC system has been appropriately calibrated. Polymers of known molecular weight are used to calibrate and these must be of the same molecular structure and chemical composition as the unknown block polymers that are measured. Anionically polymerized linear block polymers are close to monodisperse and it is both convenient and adequately descriptive to report the "peak" molecular weight of the narrow molecular weight distribution observed. The "peak" molecular weight is very nearly the same as the weight average molecular weight of the block polymer. For block polymers that are more polydisperse, a weight average molecular weight should be measured by light scattering or calculated from GPC data. Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography,* W. W. Yau, J. J. Kirkland, D. D. Bly, John Wiley & Sons, New York, N.Y., 1979.
2. *Light Scattering from Polymer Solution,* M. B. Huglin, ed., Academic Press, New York, N.Y., 1972.
3. W. Kaye and A. J. Havlik, *Applied Optics,* 12, 541 (1973).

4. M. L. McConnell, *American Laboratory,* 63, May, 1978.

As discussed above, the present invention combines in one polymer the properties desirable for pressure sensitive adhesive applications without the need for blending in an additional diblock polymer to improve tack and other adhesive properties. Polymers of the structures $$D—A—(B—A)_n—D_x$$

or $$(D—A—B)_x—Y$$

simultaneously exhibit good tack, peel strength, shear and viscosity behavior. They retain peel strength upon aging better than other polymers. As discussed above, the key to this invention is the combining of at least two network-forming, i.e., load bearing, hard blocks (A blocks) in the same molecule with one or more terminal rubber blocks (D blocks) which are relatively easy to tackify using resin additives.

Preferred polymers for use herein include S-EP-S-EP, EP-S-EP-S-EP, and $(EP\text{-}S\text{-}EP)_x$-Y (hydrogenated S-I-S-I, I-S-I-S-I, and $(I\text{-}S\text{-}I)_x$-Y, respectively). Others include S-EB-S-EB, $(EB\text{-}S\text{-}EB)_x$-Y, and EB-S-EB-S-EB, S represents styrene, I represents isoprene, B represents butadiene, EB represents hydrogenated butadiene, and EP represents hydrogenated isoprene. The preferred polymer structure for use in the present invention is S-EP-S-EP wherein the terminal EP block is significantly smaller than the mid EP block in order to maintain a percentage of load-bearing polymer (the S-EP-S portion) which will give acceptable shear properties.

The materials of the present invention are useful in adhesives (including pressure sensitive adhesives, packaging adhesives, contact adhesives, laminating adhesives, weatherable tapes, and assembly adhesives), labels, sealants, oil gels, maskants, coatings, and films. It may be necessary for a formulator to combine a variety of ingredients together with the polymers of the present invention in order to obtain products having the proper combination of properties (such as adhesion, cohesion, durability, low cost, etc.) for particular applications. In most of these applications, suitable formulations would also contain various combinations of resins, plasticizers, fillers, solvents, stabilizers and other ingredients such as asphalt. The following are some typical examples of formulations for sealants.

It is common practice to add an adhesion promoting or tackifying resin that is compatible with the polymer, generally from 20 to 400 parts per hundred parts of polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorcz® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins. The amount of adhesion promoting resin employed varies from 0 to 400 parts by weight per hundred parts rubber (phr), preferably between 20 to 350 phr, most preferably 50 to 250 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to about 150 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the formulation. This is especially true for exterior coatings or sealants in which fillers are added not only to create the desired appeal but also to improve the performance of the sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the formulation is intended. An especially preferred filler is titanium dioxide.

If the formulation will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Combinations of primary and secondary antioxidants are preferred. Such combinations include sterically hindered phenolics with phosphites or thioethers, such as hydroxyphenylpropionates with aryl phosphites or thioethers, or amino phenols with aryl phosphites. Specific examples of useful antioxidant combinations include 3-(3,5-di-t-butyl-4-hydroxyphenyl)propionate)methane (Irganox® 1010 from Ciba-Geigy) with tris(nonylphenyl)-phosphite (Polygard® HR from Uniroyal), Irganox® 1010 with bis(2,4-di-t-butyl) pentaerythritol diphosphite (Ultranox® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

A formulator skilled in the art will see tremendous versatility in the polymers of this invention to prepare adhesives having properties suitable for many different applications.

The adhesive compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

EXAMPLES

Table IA depicts the structure of the polymer molecules which are the subject of this invention, along with structures of conventional block polymers. Table IB lists the molecular parameters of the linear polymers in data form. Table IC lists the molecular parameters of the star polymers. The linear polymers of the invention in these examples are extensions of S-EP-S triblocks created by adding an EP rubber block to one or both of the styrene blocks. The main variable in these examples is the length of these added rubber blocks. They range in molecular weight from 8M to 27M for the linear polymers and 10M to 40M for the stars. A conventional S-EP-S triblock is employed as a control, as is a conventional S-EB-S triblock which is mixed with S-EB diblock in a 70/30 ratio, respectively. For purposes of this comparison, the rubber block in the S-EB diblock is termed a terminal rubber block but is unlike the invention polymers in that the terminal rubber block is not attached to a network-forming structure.

It is important to note that the viscosities of the invention linear polymers are lower than that of the triblock control, even though their total molecular weights are equal or higher. Lower viscosity at equal or higher molecular weight is desirable because higher solids can be used in solution and less solvent is required. Also, control of film thickness is easier.

The SAFT (shear adhesion failure temperature) was measured by 1"×1" Mylar to Mylar lap joint with a 1 kg weight. SAFT measures the temperature at which the lap shear assembly fails tinder load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

In Table II, a series of 4-block S-EP-S-EP polymers are compared to the 70/30 S-EB-S/S-EB conventional polymer in a pressure sensitive adhesive formulation. The 4-block polymers differ from each other chiefly in the length of their terminal rubber blocks (see Table IB). They are superior to the conventional polymer in their ability to impart loop tack, peel strength, and holding power to steel and exhibit a low melt viscosity.

Table III illustrates the performance of 4-block S-EP-S-EP polymer compared with the S-EP-S triblock in a label formulation. The 4-block polymers, Polymers 4–7 are superior in loop tack, holding power and viscosity (low). Table IV shows the 5-block EP-S-EP-S-EP polymer in a label formulation compared with the 70/30 S-EB-S/S-EB conventional polymer. In this case, the formulations are not identical because they were formulated to an equal glass transition temperature (Tg) of −20° C. The main advantage of the multiblock polymer is low viscosity.

Tables V and VI show the polymers of the present invention retain peel strength in adhesive compositions upon aging better than conventional saturated block copolymer. In addition, the invention polymer retains a clean, adhesive mode of failure after aging, whereas a conventional adhesive based on unsaturated block copolymer failed cohesively and leaves residue on both substrate and backer.

In summary, the multiblock, rubber-terminated polymers comprising the invention are superior to conventional triblock and triblock/diblock blends in ability to impart superior holding power and viscosity (low), along with equal or better tack and peel strength to adhesive compositions. This balance of properties is unique and increases formulating flexibility by allowing formulators to achieve a superior balance of properties in pressure-sensitive adhesives.

TABLE I

Polymer Descriptions

A. Polymer Structures

| | | |
|---|---|---|
| Invention: | | |
| S-EP-S-EP | 4-block polymers | #1–7 |
| EP-S-EP-S-EP | 5-block polymer | #4903 |
| Star ($EP_1$-S-$EP_2$)-DVB | up to thirty 3-block arms | #8–11 |
| Triblock: | | |
| S-EP-S | 3-block polymer | #6906 |
| Conventional: | | |
| S-EB-S 70%<br>S-EB 30% | triblock/diblock blend | #1657 |

B. Linear Polymer Molecular Parameters

| | Within Invention | | | | | | | Triblock | Conventional Polymer |
|---|---|---|---|---|---|---|---|---|---|
| Polymer Number | 1 & 6 | 2 | 3 | 4 | 5 | 7 | 4903 | 6906 | 1657 |
| Styrene Block Mol. Wt., M | 6.3 | 6.1 | 5.1 | 6.5 | 6.7 | 6.4 | 6.5 | 5.5 | 5.3 |
| Polymeric Styrene Content, % | 18.7 | 18.9 | 14.8 | 20.3 | 21.8 | 21.1 | 17.6 | 17.0 | 13 |
| Total Mol. Wt., M | 73 | 73 | 76 | 67 | 65 | 67 | 82 | 71 | 86 |
| Number of Terminal Rubber Blocks | 1 | 1 | 1 | 1 | 1 | 1 | 2 | 0 | 1 on 30% of blend (diblock) |
| Mol. Wt. of Terminal Rubber Blocks, M | 8 | 23 | 27 | 8 | 8 | 10 | 12.8 | — | 38 |
| Solution viscosity, 20% in toluene, cps | 605 | 540 | 700 | 670 | 640 | 650 | 655 | 990 | 1250 |
| Ratio $\frac{\text{Term MW}}{\text{Inner MW}}$ | 0.15 | 0.61 | 0.70 | 0.19 | 0.19 | 0.23 | 0.29 | — | — |
| Mol. Wt. Internal Rubber Block, M | 52.4 | 37.8 | 38.8 | 42.7 | 42.1 | 43.0 | 43.4 | 60 | — |

C. Polymer Molecular Parameters - Star ($EP_1$-S-$EP_2$)xDVB Polymers

| | Within Invention | | | |
|---|---|---|---|---|
| Polymer Number | 8 | 9 | 10 | 11 |
| Styrene Block Mol. Wt., M | 8.5 | 15 | 16 | 6 |
| Polymeric Styrene Content, % | 12.2 | 22.4 | 22.6 | 9.1 |
| Total Mol. Wt., M | 480 | 440 | 447 | 396 |
| Mol. Wt. of Terminal $EP_1$ Rubber Blocks, M | 10 | 30 | 35 | 40 |
| Mol. Wt. of $EP_2$ Blocks, M | 45 | 23 | 17 | 16 |
| Ratio $\frac{\text{Term MW}}{\text{Inner MW}}$ | 0.22 | 1.30 | 2.06 | 2.5 |

TABLE II

Properties of Adhesive Formulations
Comparison of 4-Block Linear Polymers with Conventional Polymer

| Formulation Number | 1 | 2 | 3 | 4 |
|---|---|---|---|---|
| A. Formulations | | | | |
| Base Polymer Type | Conventional Polymer #1657 di/triblock | Polymer 2 S—EP—S—EP tetrablock | Polymer 3 S—EP—S—EP tetrablock | Polymer 1 S—EP—S—EP tetrablock |
| Base Polymer | 100.0 | 100.0 | 100.0 | 100.0 |

TABLE II-continued

Properties of Adhesive Formulations
Comparison of 4-Block Linear Polymers with Conventional Polymer

| Formulation Number | 1 | 2 | 3 | 4 |
|---|---|---|---|---|
| Hydrogenated Hydrocarbon Resin, s.p. 78° C. | 94 | 94 | 94 | 94 |
| Hydrogenated Hydrocarbon Resin, s.p. 18° C. | 56 | 56 | 56 | 56 |
| Stabilizers | 1.5 | 1.5 | 1.5 | 1.5 |
| Total phr* | 251.5 | 251.5 | 251.5 | 251.5 |
| B. Properties | | | | |
| Rolling Ball Tack, cm | 1.2 | 3.0 | 2.4 | 4.2 |
| Polyken Probe Tack, kg | 1.0 | 0.66 | 0.70 | 1.14 |
| Loop Tack, oz/in | 67 | 83 | 79 | 77 |
| 180 degree Peel, pli | 2.9 | 3.2 | 3.2 | 3.6 |
| Holding Power to Steel, min | 98 | 268 | 132 | 1130 |
| Holding Power to Kraft, min | 93 | 8.2 | 14 | 83 |
| SAFT/Mylar, ° C. | 70 | 68 | 58 | 72 |
| SAFT/Kraft, ° C. | 51 | 53 | 40 | 52 |
| Melt viscosity at 350° F., cps, M | 35.2 | 15.6 | 16.0 | 15.9 |

*phr is parts per hundred rubber wherein the rubber is the polymer

TABLE III

Properties of Adhesive Formulations
Comparison of 4-Block Linear Polymers with Triblock Polymer

| Formulation Number | 5 | 6 | 7 | 8 | 9 |
|---|---|---|---|---|---|
| A. Formulations | | | | | |
| Base Polymer Type | S—EP—S | | all S—EP—S—EP | | |
| | Polymer 6906 | Polymer 4 | Polymer 5 | Polymer 6 | Polymer 7 |
| Base Polymer | 100.0 | 100.0 | 100.0 | 100.0 | 100.7 |
| Hydrogenated Hydrocarbon Resin, s.p. 78° C. | 111.0 | 111.8 | 110.9 | 111.0 | 109.3 |
| Hydrogenated Hydrocarbon Resin, s.p., 18° C. | 120.0 | 121.6 | 122.4 | 120.0 | 124.1 |
| Stabilizers | 1.5 | 1.5 | 1.5 | 1.5 | 1.5 |
| Total phr | 332.5 | 334.9 | 334.8 | 332.5 | 334.9 |
| B. Properties | | | | | |
| Rolling Ball Tack, cm | 1.8 | 24 | 23 | 4.1 | 27 |
| Polyken Probe Tack, kg | 2.0 | 1.18 | 1.39 | 1.23 | 1.25 |
| Loop Tack, oz/in | 64 | 88 | 86 | 90 | 92 |
| 180 Degree Peel, pli | 4.7 | 6.6 | 6.5 | 4.4 | 5.9 |
| Holding Power to Steel, min | 78 | 703 | 756 | 387 | 840 |
| Holding Power to Kraft, min | 41 | 3.1 | 0.87 | 89 | 2.5 |
| SAFT/Mylar, ° C. | 60 | 64 | 65 | 57 | 66 |
| SAFT/Kraft, ° C. | 40 | 38 | 35 | 38 | 37 |
| Melt Viscosity at 350° F., cps | 11,420 | 7,520 | 7,230 | 6,070 | 7,670 |

TABLE IV

Properties of Adhesive Formulations
Comparison of 5-Block Polymer with Conventional Polymer

| Formulation Number | 7 | 8 |
|---|---|---|
| A. Formulations | | |
| Base Polymer Type | Polymer 1657 di/triblock | Polymer 4903 5-block |

TABLE IV-continued

Properties of Adhesive Formulations
Comparison of 5-Block Polymer with Conventional Polymer

| Formulation Number | 7 | 8 |
|---|---|---|
| Base Polymer | 100.0 | 100.0 |
| Hydrogenated Hydrocarbon Resin, s.p., 85° C. | 108.2 | 96.1 |
| Hydrogenated Hydrocarbon Resin, | 152.8 | 149.0 |

TABLE IV-continued

Properties of Adhesive Formulations
Comparison of 5-Block Polymer with Conventional Polymer

| Formulation Number | 7 | 8 |
|---|---|---|
| s.p., 18° C. Stabilizers | 1.5 | 1.5 |
| Total phr | 362.5 | 346.6 |
| B. Properties | | |
| Rolling Ball Tack, cm | 1.9 | 5.3 |
| Polyken Probe Tack, kg | 1.8 | 2.2 |
| Loop Tack, oz/in | 80 | 77 |
| 180 degree Peel, pli | 5.4 | 6.2 |
| Holding Power to Steel, min | 67 | 61 |
| Holding Power to Kraft, min | 3.4 | 2.1 |
| SAFT/Mylar, ° C. | 49 | 47 |
| SAFT/Kraft, ° C. | <38 | <38 |
| Melt Viscosity at 350° F., cps | 9270 | 5240 |

TABLE V

Outdoor Aging
(45 deg. to South)
Pressure Sensitive Tape

| Base Polymer of Formulation | Conventional Saturated Polymer(1) | Invention Polymer Polymer 1(1) | Conventional Unsaturated Polymer(2) |
|---|---|---|---|
| Aging Time, days | 180 deg. Peel Strength, pli | | |
| 0 | 4.1A(3) | 6.4A | 9.3A |
| | | Aged through Glass | |
| 15 | 6.0A | 6.9A | 9.5C |
| 30 | 4.3A | 5.4A | 6.9C |
| | | Aged through Mylar | |
| 15 | 5.4A | 7.2A | 10.8C |
| 30 | 4.6A | 5.5A | 7.5C |

(1)Formulation: Conventioal Polymer and Polymer 5(4-block) as described in Table I, 100; Regalrez 1085 resin, 125; Regalrez 1018, 20; Irganox 1010, 1.0; Tinuvin 770, 0.25; Tinuvin 327, 0.25(all formulations are given in parts by weight-pbw). Regalrez 1085 and 1018 are hydrogenated styrene/alpha methyl styrene copolymers made by Hercules. Irganox 1010 is a hindered phenolic antioxidant from Ciba Geigy. Tinuvin 327 and 770 are UV stabilizers from Ciba Geigy.
(2)Formulation: Polymer (linear styrene-isoprene-styrene block copolymer, 160,000 mol wt., 15% styrene content), 100; Piccotac 95 resin (a commonly used tackifying resin), 135; Shellflex 371 oil, 15; Irganox 1010, 1.0; Tinuvin 770, 0.25; Tinuvin 327, 0.25.
(3)A signifies adhesive failure; C, cohesive failure.

TABLE VI

Accelerated Aging
(Laboratory QUV Cabinet, UVB 313 lamp)
Pressure Sensitive Tape

| Base Polymer of Formulation | Conventional Saturated Polymer(1) | Invention Polymer Polymer 1(1) | Conventional Unsaturated Polymer(2) |
|---|---|---|---|
| Aging Time, hr. | 180 deg. Peel Strength, pli | | |
| 0 | 3.9A(3) | 6.5A | 8.8A |
| | | Aged through Glass | |
| 100 | 5.4A | 7.2A | 6.5C |

TABLE VI-continued

Accelerated Aging
(Laboratory QUV Cabinet, UVB 313 lamp)
Pressure Sensitive Tape

| Base Polymer of Formulation | Conventional Saturated Polymer(1) | Invention Polymer Polymer 1(1) | Conventional Unsaturated Polymer(2) |
|---|---|---|---|
| 300 | 2.7A | 6.8A | 4.9C |
| 500 | 3.8A | 5.3A | —(4) |

(1)See Table V, footnote 1, for formulation.
(2)See Table V, footnote 2, for formulation.
(3)A signifies adhesive failure; C, cohesive failure.
(4)Backing failed.

Table VII below illustrates the performance of star ($EP_1$-S-$EP_2$)-DVB star block copolymers in adhesive formulations containing different amounts of tackifying resins. The results show that formulations 9 through 11 containing polymers as described in the present invention all exhibit an acceptable balance of properties whereas formulation 12 which utilizes a polymer which is not within the scope of the present invention has very poor holding power.

TABLE VII

Properties of Adhesive Formulations
Comparison of Star Block Copolymers

| Formulation Number | 9 | 10 | 11 | 12 |
|---|---|---|---|---|
| Base Polymer Type | 10 | 9 | 8 | 11 |
| A. Formulations | | | | |
| Base Polymer | 100 | 100 | 100 | 100 |
| Hydrogenated Hydrocarbon Resin, s.p. 85° C. | 156 | 156 | 167 | 170 |
| Hydrogenated Hydrocarbon Resin, s.p. 18° C. | 244 | 244 | 233 | 230 |
| Stabilizers | 1.5 | 1.5 | 1.5 | 1.5 |
| Total phr | 501.5 | 501.5 | 501.5 | 501.5 |
| B. Properties | | | | |
| Rolling Ball Tack, cm | 25 | 21 | 22 | 11 |
| Polyken Probe Tack, kg | 1.7 | 2.3 | 2.2 | 1.7 |
| Loop Tack, oz/in | 112 | 104 | 105 | 127 |
| 180 deg. Peel Strength, pli | 5.4 | 5.1 | 5.0 | 6.8 |
| Holding Power to Steel, min | 159 | 387 | 133 | 1.2 |
| Holding Power to Kraft, min | 113 | 81 | 622 | 11 |

Table VIII below provides the normalized molecular weight factor for each of polymers 1 through 11. Also provided are the polyken probe tack, loop tack, and holding power to steel exhibited by these polymers in standard formulations of either 40 percent polymer (Polymers 1–3), 30 percent polymer (Polymers 4–7), or 20 percent polymer (Polymers 8–11). The remainder of the formulations are made up of hydrogenated hydrocarbon resin, s.p. 85° C., and a second hydrogenated hydrocarbon resin, s.p., 18° C. in ratios to give a Tg in the formulation of about −15° C., and 1.5 phr stabilizers (See Tables II, III, and VII). Also provided is the log of the holding power to steel. When the log of the holding power to steel is plotted versus the normalized molecular weight factor, an approximate straight line relationship emerges. It can be seen by reviewing Table VIII that when the normalized molecular weight factor exceeds $180\times10^{-6}$ for polymer 11, the polyken probe tack is reasonable as is the loop tack but the holding power to steel is extremely poor. The other polymers all give a reasonable balance of these properties.

TABLE VIII

Effect of Normalized Molecular Weight Factor

| Polymer | Nor. MW Factor × $10^{-6}$ | PPT. kg | Loop Tack, oz/in | HP Steel, min | Log HP Steel |
|---|---|---|---|---|---|
| 1 | 29.1 | 1.14 | 77 | 1130 | 3.053 |
| 2 | 114 | 0.66 | 83 | 268 | 2.428 |
| 3 | 159 | 0.7 | 79 | 132 | 2.121 |
| 4 | 46.5 | 1.18 | 88 | 703 | 2.847 |
| 5 | 42.8 | 1.39 | 86 | 756 | 2.879 |
| 6 | 39.5 | 1.23 | 85 | 387 | 2.588 |
| 7 | 54.5 | 1.25 | 92 | 840 | 2.924 |
| 8 | 19.1 | 2.15 | 112 | 133 | 2.124 |
| 9 | 66.3 | 2.29 | 104 | 387 | 2.588 |
| 10 | 103 | 1.67 | 105 | 159 | 2.201 |
| 11 | 350 | 1.73 | 127 | 1.2 | 0.0792 |

I claim:

1. An adhesive composition comprising (a) a nontapered multiblock copolymer of the formula

D—A—B—A 1) wherein A is a vinyl aromatic hydrocarbon polymer block having a peak molecular weight as determined by gel permeation chromatography of from 4000 to 35,000,
2) B is a hydrogenated butadiene polymer block having a peak molecular weight as determined by gel permeation chromatography of from 20,000 to 200,000, and the vinyl content of the polymer block is from 30 to 65 percent by weight,
3) D is a hydrogenated isoprene polymer block having a peak molecular weight as determined by gel permeation chromatography of from 5000 to 50,000,
4) the ratio of the molecular weight of D to the molecular weight of B ranges such that the normalized peak molecular weight as determined by gel permeation chromatography factor ranges from greater than 0 to $180\times10^{-6}$, and
5) the copolymer has a vinyl aromatic hydrocarbon content of from 9 to 35 percent by weight; and (b) a tackifying resin.

*2. A nontapered multiblock copolymer of the formula*

*D—A—B—A—D*

*1) wherein A is a vinyl aromatic hydrocarbon polymer block having a peak molecular weight as determined by gel permeation chromatography of from 4000 to 35,000,*

*2) B is a hydrogenated isoprene polymer block having a peak molecular weight as determined by gel permeation chromatography of from 20,000 to 200,000,*

*3) D is a hydrogenated isoprene polymer block having a peak molecular weight as determined by gel permeation chromatography of from 5000 to 50,000,*

*4) the ratio of the peak molecular weight as determined by gel permeation chromatography of D to the molecular weight of B ranges such that the normalized peak molecular weight as determined by gel permeation chromatography factor ranges from greater than 0 to $180\times10^{-6}$,*

*5) and the copolymer has a vinyl aromatic hydrocarbon content of from 9 to 35 percent by weight.*

*3. The copolymer of claim 2 wherein the normalized molecular weight factor ranges from greater than 0 to $100\times10^{-6}$.*

*4. The copolymer of claim 2 wherein the molecular weight ratio before normalizing is less than 0.4.*

*5. An adhesive composition comprising the polymer of claim 4 and a tackifying resin.*

*6. An adhesive composition comprising the polymer of claim 2 and a tackifying resin.*

*7. An adhesive composition comprising*

*(a) a nontapered multiblock copolymer of the formula*

*D—A—B—A*

*1) wherein A is a vinyl aromatic hydrocarbon polymer block having a peak molecular weight as determined by gel permeation chromatography of from 4000 to 35,000,*

*2) B is a hydrogenated isoprene polymer block having a peak molecular weight as determined by gel permeation chromatography of from 20,000 to 200,000,*

*3) D is a hydrogenated isoprene polymer block having a peak molecular weight as determined by gel permeation chromatography of from 5000 to 50,000,*

*4) the ratio of the molecular weight of D to the molecular weight of B ranges such that the normalized peak molecular weight as determined by gel permeation chromatography factor ranges from greater than 0 to $180\times10^{-6}$, and*

*5) the copolymer has a vinyl aromatic hydrocarbon content of from 9 to 35 percent by weight; and*

*(b) a tackifying resin.*

*8. The composition of claim 7 wherein the normalized molecular weight factor ranges from greater than 0 to $100\times10^{-6}$.*

*9. The composition of claim 7 wherein the molecular weight ratio, before normalizing, is less than 0.4.*

* * * * *